(No Model.)
F. KRUSE.
CLUTCH PULLEY.
No. 434,150. Patented Aug. 12, 1890.
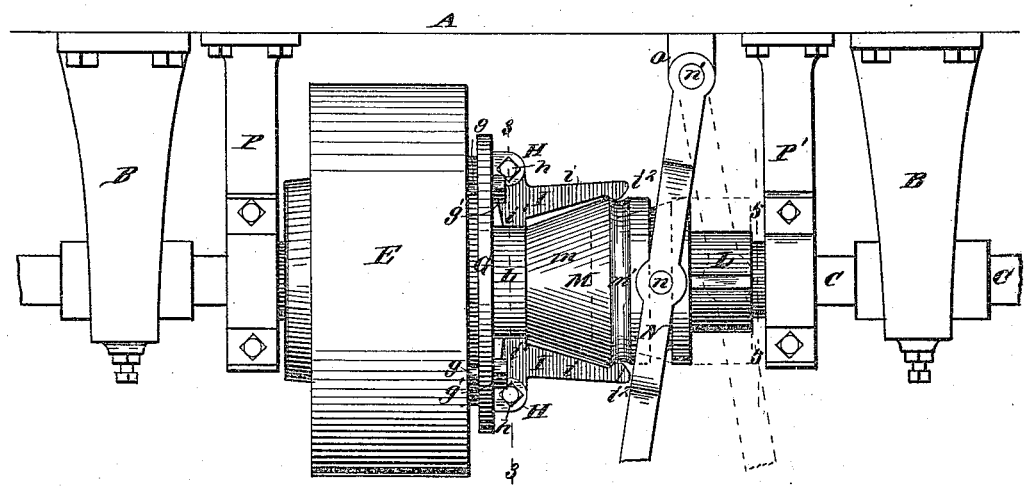
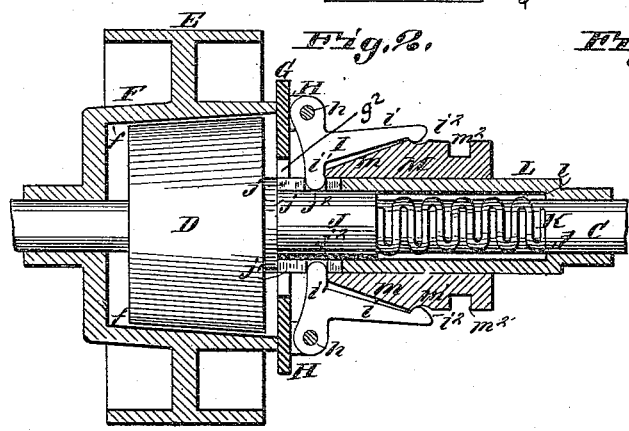
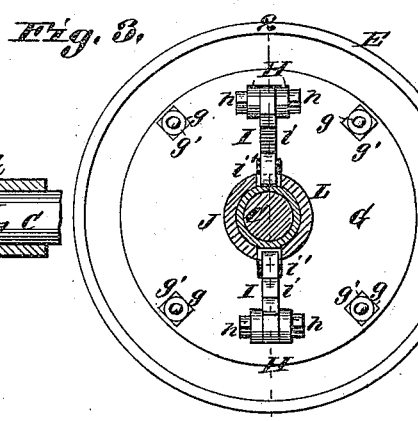
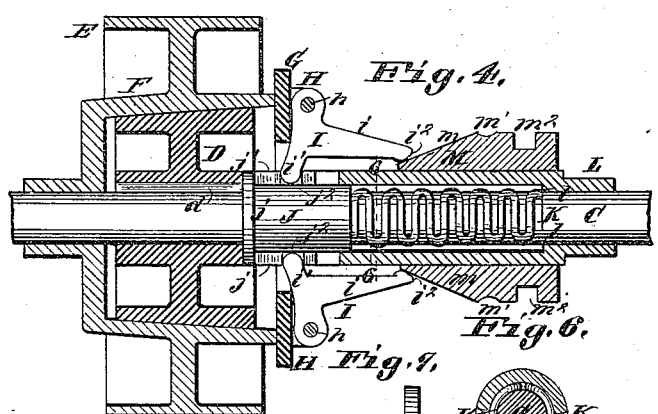
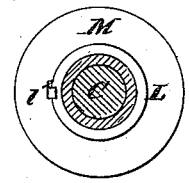
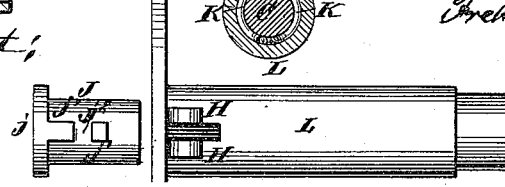
Inventor,
Frederick Kruse
Attest:
W. C. Becker
E. M. Turner

UNITED STATES PATENT OFFICE.

FREDERICK KRUSE, OF ST. LOUIS, MISSOURI.

CLUTCH-PULLEY.

SPECIFICATION forming part of Letters Patent No. 434,150, dated August 12, 1890.

Application filed March 15, 1890. Serial No. 344,037. (No model.)

*To all whom it may concern:*

Be it known that I, FREDERICK KRUSE, a citizen of the United States, residing at St. Louis, in the State of Missouri, have invented certain new and useful Improvements in Clutch-Pulleys; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a cone clutch-pulley wherein the pulley is recessed in the hub to receive the cone and is fixed on a sleeve by which it is drawn in the clutch with the cone, which is fixed on a shaft revolving freely in the sleeve, the pulley and sleeve being supported independent of the shaft, by which is obtained a better and more reliable clutch than can be obtained by moving the cone to the pulley, and also to provide a device for clutching and unclutching the pulley, which will relieve the shaft to revolve freely independent of the sleeve and the clutching and unclutching device, and which will hold the pulley firmly in clutch, the shaft to run freely only when the pulley is unclutched. I attain these objects by the mechanism illustrated in the accompanying drawings, in which—

Figure 1 is the side elevation showing the manner of hanging the clutch, showing lever in position in solid lines when clutch is out of engagement, and dotted lines indicate when clutch is engaged. Fig. 2 is a vertical longitudinal section on line 2 4, showing cone, collar, shaft, and spring in elevation. Fig. 3 is a vertical transverse section on line 3 3 of Fig. 1. Fig. 4 is a vertical longitudinal section on line 2 4 of Fig. 3, with sliding collar and spring in elevation. Fig. 5 is a vertical transverse section on line 5 5 of Fig. 1. Fig. 6 is a vertical transverse section on line 6 6 of Fig. 4, showing form of spring relative to the shaft. Fig. 7 is a detail view of sliding collar and sleeve.

Similar letters will refer to similar parts throughout the different views.

A is a ceiling having secured thereto the hangers B, in which the shaft C is journaled, and on shaft C the cone-clutch D is secured by the key $d$ on shaft C.

E is a pulley having the recessed hub F with its inner face $f$ inclined correspondingly to the incline of the face of the cone-clutch D to adapt the hub to be drawn upon the cone firmly and evenly, so that the friction of the face of the cone with the inner inclined face of the hub will cause the cone to clutch the hub of the pulley.

G is a face-plate secured to the face of the recessed hub F by bolts $g$ and nuts $g'$ and having the recess $g^2$. Secured on the face-plate G are the lugs H, to which bell-crank levers I are pivoted by pivots $h$. The bell-crank levers I have the arms $i$ with curved projections $i^2$ on the ends of their inner sides and have also the arms $i'$.

J is a sleeve on the shaft C, having the collar $j$, and the collared end of the sleeve J bears against the hub of the cone clutch-pulley D, and the sleeve J has also the ribs $j'$, having the recesses $j^2$ to receive the arms $i$ of the bell-crank I.

K are two semicircular return-bend springs.

L is a sleeve on shaft C, secured to face-plate G and counterbored from its inner end to receive the uncollared end of sleeve J and also to receive the springs K, which fit loosely in the counterbored recess of sleeve L and surround the shaft C, which revolves freely inside sleeve J and L and between the springs K. The ends of springs K have their bearing near one end of sleeve L against the uncollared end of sleeve J, and near the other end of sleeve L against the shoulder $l$ of sleeve L. The sleeve L carries fixed thereto the pulley E.

M is a collar on sleeve L, working on a feather in a recess $l^2$ in sleeve L, for shifting the clutch—that is, throwing it in and out of engagement—and has the inclined face $m$, the curved groove $m'$ to receive the projection $i^2$ on arms $i$ of bell-crank levers I, and also the groove $m^2$. The groove $m'$ and $m^2$ extend completely around the shifting-collar M. The collar M may revolve freely on the sleeve L and the feather and the recess $l^2$ be dispensed with; but I prefer to use them.

N is a shifting-lever spanning the shifting-collar M and having the shifting-pins $n$ pivoted therein, which work in the groove $m^2$ in the shifting-collar M, and the shifting-lever N is pivoted by a pivot $n'$ to the hanger O, which latter is secured to the ceiling.

P and P′ are hangers secured to the ceiling, in the former of which the sleeve L is loosely journaled in such manner that when the clutch is out of engagement the shaft C may turn freely independent of the sleeve and without revolving. A spiral spring may be used instead of the semicircular return-bend springs K; but I prefer the latter as easier to remove and replace.

The method of using and mode of operation of my clutch-pulley is as follows: When the pulley is out of clutch, as shown in Figs. 1 and 2, the shifting-lever is inclined toward the hanger P, the arms $i$ are at the top of the inclined face $m$ of the shifting-collar M, with their projections $i^2$ resting in a curved groove $m'$ of that collar, and the sleeve L is closed up against the ribs $j'$ and the face of the cone completely out of contact with the inclined face of the hub F of the pulley E, so that it runs freely. To put the pulley in clutch, the shifting-lever N is thrown toward the hanger P′ and draws with it, in the same directions by the shifting-pins $n$, the shifting-collar M, and as it does so the projections $i^2$ on the arms $i$ of the bell-crank levers I are drawn out of the groove $m'$, and the arms $i$ descend the inclined face of the shifting-collar M. As they descend, the arms $i'$ of the bell-crank levers I release their pressure on the ears of the ribs $j'$ next the springs K, which allow those springs to expand and exert their force against the sleeve J and the shoulder $l$, bringing the sleeve in close contact with the hub of the cone. The opposite end of the spring exerts its pressure against the shoulder $l$ of the sleeve L, and by such pressure moves the sleeve L in the opposite direction to that sleeve J was moved by the other end of the spring, and thus brings the internal face of the hub of the pulley in contact with the cone. To unclutch the pulley, the shifting-lever N is thrown toward the hanger P. As it moves in that direction, the shifting-collar M, being forced under the arms $i$ of the bell-crank levers I, causes the arms $i$ to ascend the inclined face $m$ of the shifting-collar M, which forces the arms $i'$ of the bell-crank levers I, acting against the part of the ribs $j'$ near the uncollared end of the sleeve J, to compress the spring K and force the sleeve J away from the hub of the cone-clutch D, and at the same time causes the pivoted end of the arms $i$ to force the pulley E and the sleeve L, which carries it in an opposite direction from the movement of the sleeve J, compressing the springs K, and this action continues as the arms $i$ are forced up the inclined face $m$ of the shifting-collar M until the projection $i^2$ on the arms $i$ pass into the groove $m'$, when the ribs $j'$ and the sleeve L will be drawn together, and the inclined face $f$ of the recessed hub F of the pulley E will be free from contact with the inclined face of the cone and the pulley unclutched.

Having fully described my invention, what I claim, and desire to secure by Letters Patent, is—

1. The combination of the face-plate G, the lugs H, the bell-crank levers I, with their arms $i$ and $i'$, pivots $h$ to pivot the bell-cranks to the lugs H, the sleeve J, with its collar $j$, ribs $j'$, and recesses $j^2$, and the shaft C, all substantially as described.

2. The combination of the sleeve J, with its collar $j$, ribs $j'$, and recesses $j^2$, the sleeve L, counterbored to receive the spring K, and the springs K, the shoulder $l$, the pulley E, having the recessed hub F, with its inclined face $f$, secured on the sleeve L, and the shaft C, all substantially as described.

3. The combination of the counterbored sleeve L, the shoulder $l$, the springs K, the sleeve J, with its collar $j$, ribs $j'$, and recesses $j^2$, the bell-crank levers I, with their arms $i$ and $i'$, the lugs H, the pivots $h$, the face-plate G, and the shaft C, all substantially as described.

4. The combination of the shaft C, the cone-clutch D, secured thereon, the counterbored sleeve L, having the shoulder $l$, the pulley E fixed thereto, having the recessed hub F, with its inclined face $f$, the face-plate G, the lugs H, the pivots $h$, the bell-crank levers I, with their arms $i$ and $i'$, the sleeve J, with its collar $j$, ribs $j'$, and recesses $j^2$, the springs K, shifting-collar M, with its inclined face $m$, curved groove $m'$, and groove $m^2$, all substantially as described.

5. The combination of the shaft C, the cone-clutch D, secured thereon, the counterbored sleeve L, having the shoulder $l$, with the pulley E fixed to said pulley, having the recessed hub F, with its inclined face $f$, the face-plate G, the lugs H, the pivots $h$, the bell-crank levers I, with their arms $i$ and $i'$, the sleeve J, with its collar $j$, ribs $j'$, and recesses $j^2$, the springs K, the shifting-collar M, with its inclined face $m$, the curved groove $m'$, and the hangers P and P′, and the hangers B, all substantially as described.

6. The combination of the face-plate G, lugs H, pivots $h$, bell-crank levers I, with their arms $i$ and $i'$, the sleeve J, with its collar $j$, ribs $j'$, and recesses $j^2$, the counterbored sleeve L, the shoulder $l$, the springs K, and the shifting-collar M, with its inclined face $m$, curved groove $m'$, and shaft C, all substantially as described.

7. The combination of the face-plate G, the lugs H, the pivots $h$, the bell-crank levers I, the sleeve J, with its collar $j$, ribs $j'$, and recesses $j^2$, and the shifting-collar M, with its inclined face $m$ and groove $m'$, and the shaft C, all substantially as described.

8. A cone-clutch fixed on a shaft and a pulley fixed on a sleeve within which the shaft carrying the cone-clutch revolves freely, having a recessed hub, with its inner face inclined the opposite to the incline of the outer face of the cone-clutch and adapted to be pulled upon the cone-clutch by the sleeve to engage the cone-clutch by the friction of the inclined surfaces of the hub and cone-clutch and to be forced off the cone-clutch again by the sleeve to disengage from it and allow it to run freely with the shaft independent of the pulley and the sleeve to which the pulley is secured, the pulley and sleeve being supported independently of the shaft.

In testimony whereof I affix my signature in presence of two witnesses.

FREDERICK KRUSE.

Witnesses:
W. C. BACKOF,
GEO. J. CHAPMAN.